US010922557B2

(12) United States Patent
Schlicht et al.

(10) Patent No.: US 10,922,557 B2
(45) Date of Patent: Feb. 16, 2021

(54) METHOD FOR PROCESSING SENSOR DATA IN MULTIPLE CONTROL UNITS, PREPROCESSING UNIT, AND TRANSPORTATION VEHICLE

(71) Applicant: VOLKSWAGEN AKTIENGESELLSCHAFT, Wolfsburg (DE)

(72) Inventors: Peter Schlicht, Wolfsburg (DE); Stephan Scholz, Meine (DE)

(73) Assignee: VOLKSWAGEN AKTIENGESELLSCHAFT

( * ) Notice: Subject to any disclaimer, the term of this patent is extended or adjusted under 35 U.S.C. 154(b) by 141 days.

(21) Appl. No.: 16/253,783

(22) Filed: Jan. 22, 2019

(65) Prior Publication Data
US 2019/0228236 A1  Jul. 25, 2019

(30) Foreign Application Priority Data
Jan. 23, 2018  (DE) .................. 10 2018 200 982

(51) Int. Cl.
*G06K 9/00* (2006.01)
*G06K 9/46* (2006.01)
(Continued)

(52) U.S. Cl.
CPC ........ *G06K 9/00791* (2013.01); *B60R 16/023* (2013.01); *G01S 15/931* (2013.01);
(Continued)

(58) Field of Classification Search
CPC .. G06K 9/00791; G06K 9/00798; G06K 9/46; G01S 17/86; G01S 15/931;
(Continued)

(56) References Cited

U.S. PATENT DOCUMENTS

| 2014/0104051 A1 | 4/2014 | Breed |
| 2015/0363706 A1 | 12/2015 | Huber et al. |

(Continued)

FOREIGN PATENT DOCUMENTS

| DE | 102011083254 A1 | 3/2013 |
| DE | 102015104934 A1 | 10/2016 |

(Continued)

OTHER PUBLICATIONS

Zheng et al.; Next Generation Automotive Architecture Modeling and Exploration for Autonomous Driving; IEEE Computer Society Annual Symposium on VLSI; 2016; pp. 53-58.
Search Report for German Patent Application No. 10 2018 200 982.1; dated Oct. 12, 2018.

*Primary Examiner* — Ping Y Hsieh
(74) *Attorney, Agent, or Firm* — Barnes & Thornburg LLP

(57) ABSTRACT

A method for processing sensor data in a number of controllers in a controller complex. The controllers are connected to at least one sensor via at least one communication bus, wherein the sensor data of the at least one sensor are processed by at least two different controllers in stages. At least one processing stage is concordant in the two controllers or is equivalent to the other stage at least in so far as the results of the processing are converted into one another by a conversion. Provision is made for a preprocessing unit to which the sensor data of the at least one sensor are supplied, wherein the processing of the sensor data in the at least one concordant processing stage is performed in the preprocessing unit, and the processed sensor data are forwarded to the at least two different controllers for individual further processing.

19 Claims, 4 Drawing Sheets

(51) Int. Cl.
| | |
|---|---|
| *G06N 3/08* | (2006.01) |
| *H04L 12/40* | (2006.01) |
| *B60R 16/023* | (2006.01) |
| *H04L 29/08* | (2006.01) |
| *G06N 3/04* | (2006.01) |
| *G01S 15/931* | (2020.01) |
| *G05D 1/02* | (2020.01) |
| *G08G 1/16* | (2006.01) |
| *G01S 17/86* | (2020.01) |

(52) U.S. Cl.
CPC ............ *G01S 17/86* (2020.01); *G05D 1/0246* (2013.01); *G06K 9/00798* (2013.01); *G06K 9/46* (2013.01); *G06N 3/0454* (2013.01); *G06N 3/08* (2013.01); *G08G 1/16* (2013.01); *H04L 12/40* (2013.01); *H04L 67/2823* (2013.01); *G06T 2207/10* (2013.01); *H04L 2012/40215* (2013.01); *H04L 2012/40241* (2013.01); *H04L 2012/40273* (2013.01)

(58) Field of Classification Search
CPC ...... G05D 1/0246; G06N 3/0454; G06N 3/08; G08G 1/16; H04L 12/40; H04L 167/2823; H04L 2012/40215; H04L 2012/40241; H04L 2012/40273; G06T 2207/10
See application file for complete search history.

(56) References Cited

U.S. PATENT DOCUMENTS

| | | |
|---|---|---|
| 2016/0358068 A1 | 12/2016 | Brothers et al. |
| 2017/0039436 A1 | 2/2017 | Chen et al. |
| 2017/0300763 A1 | 10/2017 | Zou et al. |
| 2018/0157934 A1 | 6/2018 | Hu et al. |
| 2018/0300763 A1 | 10/2018 | Hoang et al. |
| 2019/0163989 A1* | 5/2019 | Guo ................. G08G 1/167 |
| 2019/0163990 A1* | 5/2019 | Mei ................. G01C 21/32 |
| 2019/0187718 A1* | 6/2019 | Zou ................. G06K 9/6274 |
| 2019/0219697 A1* | 7/2019 | Castorena Martinez ................. G01S 17/931 |

FOREIGN PATENT DOCUMENTS

| | | |
|---|---|---|
| DE | 102015104938 A1 | 10/2016 |
| DE | 102015210881 A1 | 12/2016 |
| DE | 102016205139 A1 | 3/2017 |
| DE | 102015220616 A1 | 4/2017 |
| DE | 102017100396 A1 | 7/2017 |
| DE | 102017108255 A1 | 10/2017 |
| KR | 20060039481 A | 5/2006 |
| WO | 2008020458 A2 | 2/2008 |
| WO | 2016095117 A1 | 6/2016 |
| WO | 2016206765 A1 | 12/2016 |
| WO | 2017087041 A1 | 5/2017 |
| WO | 2019094843 A1 | 5/2019 |

* cited by examiner

METHOD FOR PROCESSING SENSOR DATA IN MULTIPLE CONTROL UNITS, PREPROCESSING UNIT, AND TRANSPORTATION VEHICLE

PRIORITY CLAIM

This patent application claims priority to German Patent Application No. 10 2018 200 982.1, filed 23 Jan. 2018, the disclosure of which is incorporated herein by reference in its entirety.

SUMMARY

Illustrative embodiments relate to the technical domain of capturing, conditioning and processing sensor data. In this case, the sensor data are forwarded to multiple controllers that need them in turn for their individual evaluation. Specifically, this involves the provision of sensor data for capturing surroundings in a transportation vehicle. Illustrative embodiments also relate to an appropriately designed preprocessing unit, a transportation vehicle that has a preprocessing unit and an appropriately designed computer program.

BRIEF DESCRIPTION OF THE DRAWINGS

Exemplary embodiments are depicted in the drawings and are explained in more detail below on the basis of the figures, in which.

DETAILED DESCRIPTION

Figure 1:
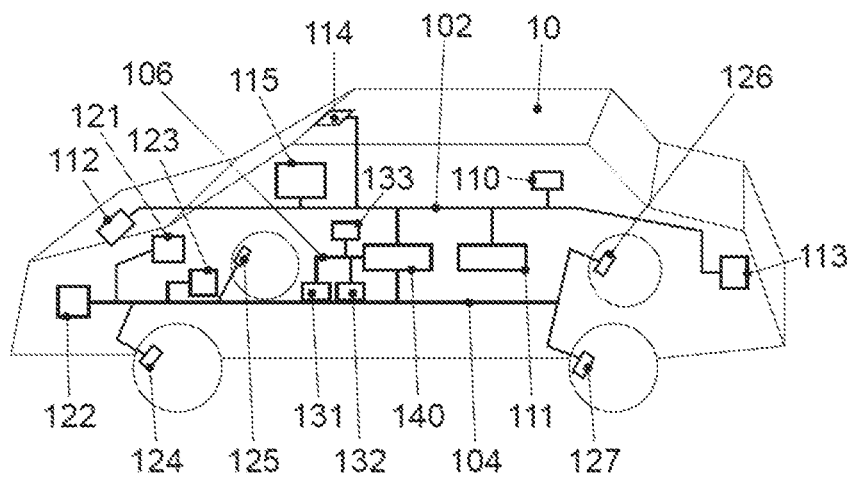
FIG. 1 shows a transportation vehicle with the transportation vehicle electronics components for the propulsion, chassis and driver assistance domains.

Modern transportation vehicles have a multiplicity of controllers installed in them. For the drive train alone, a number of controllers are used, e.g., engine controller, gearbox controller, ESP controller and others. The class of controllers that is responsible for control actions in the chassis area should also be mentioned. Such controllers are controllers for electronic chassis adjustment or controllers for driving dynamics control or controllers acting as a steering aid, such as, e.g., speed-dependent power-assisted steering. Furthermore, there are controllers that perform particular functions for assisting the driving. These are, e.g., a speed-regulating controller, a distance-regulating controller, a parking aid, an emergency-braking assist controller, etc. In addition, there are also further controllers installed in the area of the transportation vehicle body work, and catering for particular comfort functions. Cited examples are the door or window-lifter controllers, air-conditioning controllers, seat adjustment controllers, airbag controllers, inter alia. There is then furthermore the class of sensors such as multiple cameras for observing the environment, navigation appliance, RADAR or LIDAR device, communication module and entertainment module with a TV, radio, video and music function, etc.

Typically, the controllers in the different categories are each networked by a separate bus of appropriate design for the device category. It is thus possible for multiple different bus systems to be employed in the transportation vehicle. The different bus systems can be connected to one another via gateways in this case, to allow data interchange. In the domain of drive train controllers, the CAN bus is typically employed, likewise in the domain of comfort controllers. In the infotainment domain, other bus systems are also used, such as bus systems based on Ethernet technology, e.g., AVB (Audio Video Bridging), which is based on the family of standards according to the IEEE 802.3 standard. Bus systems in which the data transmission takes place by optical fiber are also able to be employed. Cited examples are the MOST (Media Oriented System Transport) bus or the D2B (Domestic Digital Bus) bus.

The dominant bus in the transportation vehicle domain is the CAN (Controller Area Network) bus according to the ISO standard. The CAN bus was developed in the 1980s and standardized in 1994. The corresponding ISO standard has the number ISO 11898. There is a standard for the high-speed domain up to 1 Mbit/s, which is the ISO 11898-2 standard. There is then a standard for the low-speed domain up to 125 kBit/s, which is the ISO 11898-3 standard. The growing volume of data means that ever higher bus loads arise on the CAN buses. This led to further development of the CAN bus. The extended CAN bus is known by the term CAN FD bus. In this case, FD stands for flexible data rate. In this CAN bus option, the data rate is switched. For the arbitration phase, the data rate remains low, as in the case of the conventional CAN bus. For transmission of the useful data, there is a switch to a higher data rate. If the useful data of a CAN FD message are transmitted more quickly, the duration of bus use shortens; and the bus load is reduced. If the transmission time remains the same as for the conventional CAN messages, it would be possible for larger volumes of data to be transported with a CAN FD message. This has also been implemented for CAN FD. Instead of the 8-byte useful data domain, CAN FD employs a 64-byte useful data domain. The data rate for transmitting the useful data domain rises, e.g., from 500 kbit/s to 2 Mbit/s in one implementation.

A trend can be identified in the automotive industry in regard to the amount and complexity of electrical systems installed in the transportation vehicle, with the number of transportation vehicle functions provided or supported by electronics increasing significantly. This trend is reinforced by developments in the domain of cooperative or autonomous driving. To take account of this, individual sensors per controller have now not been installed for a long time, but rather the sensors are connected to bus systems that are also connected to the controllers. Therefore, the sensor data can be forwarded to all controllers that need these sensor data.

The function developments of (semi)automatic driving involve a multiplicity of sensors that need to be processed for detection, seen comprehension, location and prediction. Image-processing neural networks, what are known as convolutional neural networks (CNNs), are also used for this. These involve, analogously to conventional signal processing, the incoming source signal from sensors such as video camera, radar, accordingly radio detection and ranging, LIDAR, accordingly light detection and ranging, ultrasonic or infrared sensor being processed by multiple stages. These include one or more filter stages that filter out the substantial components of the signal. The aim of the signal processing is to form feature maps.

The multiplicity of processing modules almost inevitably results in the use of equivalent (sufficiently equivalent for further processing) filters in multiple CNNs. Therefore, there is also the problem that particular controllers need to process the sensor data in the same or else at least a similar manner. The forwarding of the raw sensor data to the different controllers possibly causes a high volume of data on the communication bus, which can lead to an excessive bus utilization level. Furthermore, there is the problem that the controllers need to have the appropriate computation capacity to be able to perform the same or similar processing of the sensor data in each case. Depending on how many controllers need to process the same sensor data, the resultant multiple execution of image processing operations can lead to an increased computation and hence hardware, time and energy requirement. The problem of increased energy consumption is significant, in particular, for electric transportation vehicles.

DE 10 2015 104 934 A1 discloses the practice of storing the information about the open space, i.e., the space without detected objects, when observing the environment of a transportation vehicle as raw sensor data in a sensor-end control unit. The information is forwarded via a communication interface to a processing device that produces a map of the surrounding area.

DE 10 2015 210 881 A1 discloses a method and an apparatus for determining the position and/or the orientation of a transportation vehicle. In this case, there is provision for at least two sensors whose data are fused. A neural network is used for quality rating.

DE 10 2015 220 616 A1 discloses a method and an apparatus for providing and evaluating sensor data, in which the approach of performing the evaluation of the sensor data exclusively in the evaluation unit of the transportation vehicle is taken. The evaluation is not effected externally, i.e., the sensor unit transmits not processed sensor data but rather raw sensor data.

US 2017/0039436 A1 discloses the practice of using CNNs to evaluate image data from LIDAR sensors. Thus, particular features are extracted from the images, in particular, the lane markings.

US 2017/0300763 A1 discloses the practice of extracting such features from video camera data. CNNs are also used for this. The results of the image evaluations from multiple cameras are fused to produce an overall result in this instance.

Disclosed embodiments provide a method for processing sensor data that avoids the drawbacks described above. The computational involvement for multiple evaluation of the sensor data in the various controllers is intended to be reduced.

Disclosed is a method for processing sensor data in a communication network to which multiple computation units processing the sensor data are connected, an appropriately designed preprocessing unit, and an appropriately designed transportation vehicle.

Disclosed embodiments relate to a method and a computation unit for processing sensor information by neural networks for the consolidated further processing along the processing chain of the (semi)automatic driving.

This possibly involves an optimization method being used to determine from an existing set of CNNs a set (KONSOL) of feature maps on which the subsequent AI modules, possibly in adapted form, can perform their function without limitation. The feature maps are calculated by neural networks from the incoming data stream and made available to all the modules and controllers of the (semi)automatic driving.

The environment detection for transportation vehicles in road traffic involves AI modules, frequently deep neural networks with convolutional layers, being employed. Preprocessing of the raw data as relocation of the first convolutional layers (consolidated by the processing AI modules) in the direction of the sensors compromises the data and defines a function-specific interface between the sensors and further processing that allows further development of sensors on the one hand and of the processing modules on the other hand and thus both facilitates technical progress and affords a competitive benefit.

Specifically, the proposal relates to a method for processing sensor data in a number of controllers, wherein the controllers are connected to the at least one sensor via at least one communication bus. In this case, the sensor data of the at least one sensor are processed by at least two different controllers in stages. At least one processing stage is concordant in the two controllers or is at least equivalent. In this case, equivalence means that the results of the processing can be converted into one another by a conversion. The method is characterized in that provision is made for a preprocessing unit to which the sensor data of the at least one sensor are supplied, wherein the processing of the sensor data in the at least one concordant processing stage is performed in the preprocessing unit, and the processed sensor data are forwarded to the at least two different controllers for individual further processing. The benefits of this method are a saving of computation time and computation power for the individual controller. The effect of this is that the hardware requirement is reduced and/or that the energy requirement is reduced and accordingly also the involvement for heat dissipation is also reduced. An important benefit is also that fewer data need to be transmitted to the controllers, which reduces the bus utilization level and means that there is more bus capacity available for other applications. This is because the preprocessing of the sensor data can lead to compression of the data stream forwarded to the controllers, and hence can relieve the load on the bus systems in the transportation vehicle when used in the (semi)automatic driving. This method also allows modularization of systems for (semi)automatic driving functions. The option of standardizing an interface for forwarding the preprocessed sensor data is also presented. A benefit of this interface standardization is the flexibility for the selection of connected sensors and sensors serving the interface.

For the implementation, it is beneficial if the conversion (adaptation) for converting the computation results is performed in the controller that needs the computation results in the converted form for the individual further processing.

The method can be used for processing the data from image sensors. In this case the at least two different controllers would relate to two image-processing controllers.

Typical measures for processing the imaging sensor in stages are consistent with an image processing in which a filtering and/or an image processing is performed by neural network, in particular, a convolutional neural network CNN.

In this case, the image processing in one stage extracts a typical feature in the image and forms a feature map.

The consolidation of processing stages occurs by the transfer and hence concentration of a number of stages extracting typical features to the preprocessing unit. The relevant stages therefore do not need to be provided for repeatedly in the further-processing controllers.

Typical features in images that can be extracted by applicable CNNs are edges, contours, lines, areas, contrast, brightness, color, clarity, noise component, etc.

The preprocessing unit can be connected to the communication bus as a separate computation unit or provided for as a module of a controller that likewise needs to process the sensor data or as a module of a central gateway controller.

A possible communication bus is a serial communication bus employed in the transportation vehicle domain. It can be of CAN bus, accordingly Controller Area Network bus, of CAN FD bus, accordingly Controller Area Network bus Flexible Data rate, or of FlexRay bus or of Ethernet bus type.

For an applicable preprocessing unit used for performing the disclosed method, the same benefits are obtained as explained for the corresponding measures in connection with the method.

The preprocessing unit caters for matching the output data stream of one or more sensors to the interface format. This preprocessing unit is specific to sensor model type but in essence caters for efficient sensor-agnostic data transmission.

The interface format is a function-specific compression of the sensor information and is independent of the sensor model. In this context, function-specific expressly does not mean a dependency of the interface on a partial functionality, but rather means a specificity with regard to the function served, for example, the whole processing chain of the (semi)automatic driving. Compressed sensor data complying with the interface permit loss-free further processing of the information by subsequent components (without using the raw information), but not necessarily loss-free or somewhat loss-free restoration of the raw data. Thus, all properties of the raw data that are semantically and physically relevant to the further processing are transmitted.

The interface produces a clearly defined demarcation of the function-specific processing of the sensor information from the data provision by the sensors. The interface is defined by quality demands and definition of the relevant features. The quality demands include sensor-feature-specific demands such as confidences and processing demands such as maximum permissible latencies.

The benefits listed also apply to a transportation vehicle in which a corresponding preprocessing unit is installed.

Typical instances of application for the proposed method are communication networks in the transportation vehicle domain. These predominantly employ serial bus systems of CAN bus, accordingly Controller Area Network bus, of CAN FD bus, accordingly Controller Area Network bus Flexible Data rate, of FlexRay bus, of Ethernet bus or of LIN bus, accordingly Linear Network Bus, type.

The present description illustrates the principles of the disclosure. It therefore goes without saying that persons skilled in the art will be capable of designing different arrangements that, although not described explicitly here, embody principles of the disclosure and are likewise intended to have their scope protected.

FIG. 1 shows a transportation vehicle 10 with various electronic components. It depicts a passenger transportation vehicle Pkw. However, any other transportation vehicles would likewise be possible as the transportation vehicle. Examples of further transportation vehicles are: buses, commercial transportation vehicles, in particular, trucks Lkw, agricultural machines, construction machines, motorcycles, rail transportation vehicles, etc. The disclosed embodiments would be able to be employed generally for land transportation vehicles, rail transportation vehicles, watercraft and aircraft. The use of the disclosure is intended primarily for the transportation vehicle domain. However, as with the CAN bus, use in the field bus domain, that is to say in automation engineering, process engineering, etc., is also possible.

A multiplicity of electronic controllers are employed in a modern transportation vehicle. FIG. 1 depicts the networking of some controllers and sensors. In this case, a distinction is drawn between three different classes of controllers. The controllers of one class are in each case networked separately. The respective communication buses are connected via a central gateway controller 140. The controllers of the class of controllers for the infotainment domain are networked via the bus 102. This has the components onboard unit 111, RADAR sensor 112, reversing camera 113, front camera 114 and LCD display unit 15 connected to it. A preprocessing unit 110, the function of which will be explained even more precisely below, is likewise connected thereto. In this case, the radar (accordingly Radio Detection and Ranging) sensor 112 is used as a sensor for producing a radar cruise control or for producing a distance-warning or collision-warning device. At the same time, a LIDAR (accordingly Light Detection and Ranging) device can also be employed additionally or alternatively (not shown). Further controllers can be connected, but are not depicted.

The controllers of the class of controllers for the drive train are networked via the bus 104. This has the controllers engine controller 121, ESP controller 122 and gearbox controller 123 connected to it. The bus 104 moreover has the wheel speed sensors 124 to 127 connected to it. The reference numeral 129 denotes a diagnosis interface. Further controllers and/or sensors can be connected, but are not depicted.

The controllers of the class of controllers for the chassis and driver assistance domain are networked via the bus 106. This has the controllers chassis controller 131 and emergency braking assistance controller 132 and distance-regulation controller 133 connected to it. Further controllers and/or sensors can be connected, but are not depicted.

The distance-regulation controller 133 takes image evaluations from camera sensors (and possibly further sensors such as radar and Lidar) as a basis for regulating the speed of the transportation vehicle on the basis of the distance and the speed of transportation vehicles in front.

Figure 2:
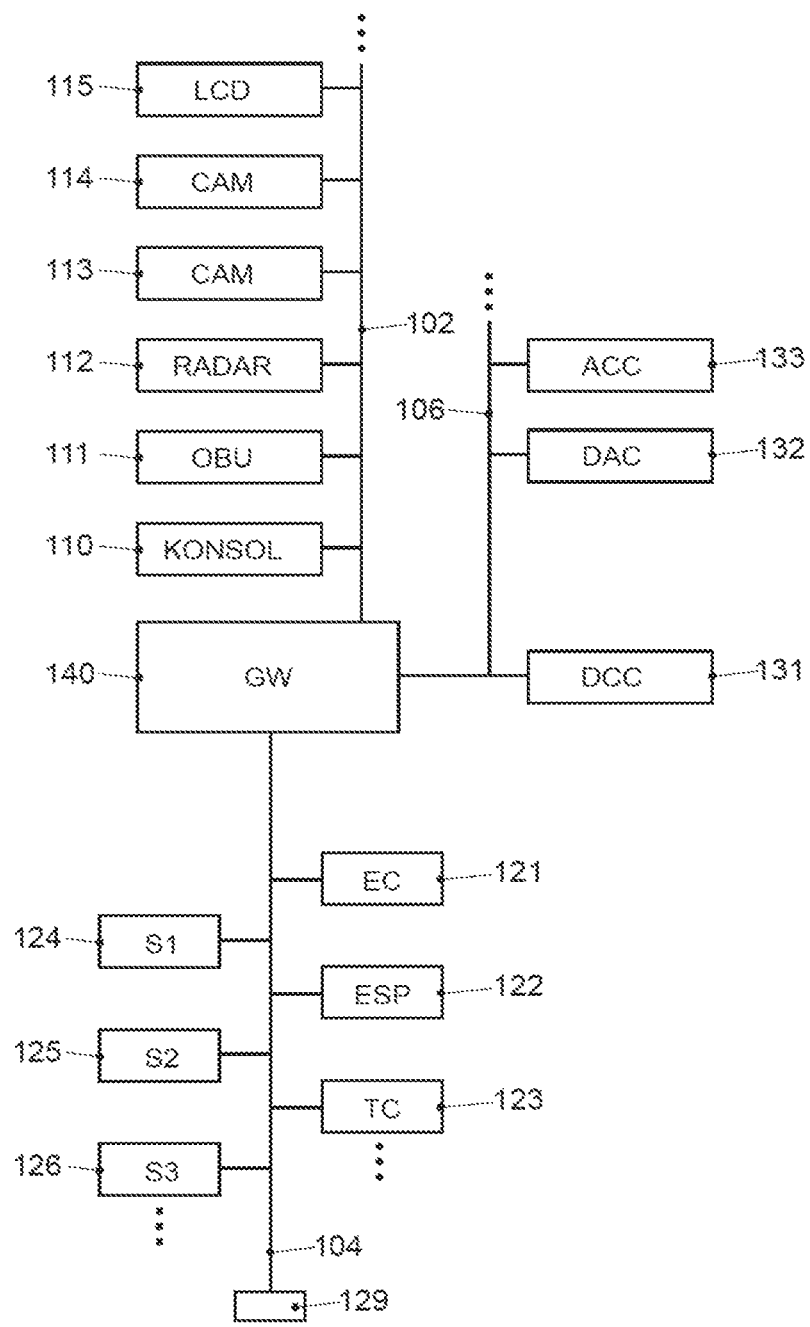
FIG. 2 shows a block diagram of a transportation vehicle communication network for the propulsion, chassis and driver assistance domains.

FIG. 2 shows the corresponding block diagram for the transportation vehicle electronics in the infotainment, propulsion, chassis and driver assistance domains. Identical reference numerals in FIG. 2 denote the same components as in FIG. 1. The three separate communication buses 102, 104, 106 are embodied as linear buses. In this case, the bus protocols for the communication buses 102, 104 and 106 can be designed according to the requirements of the controllers networked thereon. E.g., it could make sense to design the communication bus 106 for the chassis and driver assistance domain for a higher data rate than the two communication buses 102 and 104. Sensor signals relevant to the chassis, e.g., in the case of the pothole detection comfort feature, need to be reacted to extremely quickly to be able to adjust the shock absorber setting as appropriate.

For the purpose of interchanging data between subscribers connected to different communication buses 102, 104, 106, there is provision for the gateway 140. The gateway is connected to all three different bus systems 102, 104 and 106. The gateway 140 is designed to convert the data packets that it receives via one communication bus such that they can be forwarded on the other communication bus in the transmission format thereof. As depicted, the gateway 140 is connected as a central device both to the bus 102, the bus 104 and to the bus 106. It thus undertakes all the necessary format conversions when data need to be interchanged between the different bus systems.

The component 129 connected to the communication bus 104 of the drive train denotes a diagnosis interface. This can have an external diagnosis computer (not depicted) connected that can be used to query the error memory entries in the error memories of the various controllers.

In the example shown, the bus systems 102 and 104 are realized as CAN buses and the bus 106 is realized as the CAN FD bus. The physical transmission medium used in all the bus systems 102, 104, 106 is a twisted pair, to which symmetric difference voltages are applied for the transmission of information. The voltages represent symbols that a transmitter generates (encodes) according to the desired bit stream. A receiver uses the resultant symbol stream in turn to recover (decode) the contained bits.

The communication network 102 has provision for a preprocessing unit 110 in it. The preprocessing unit 110 caters for compression of the output data stream of one or more sensors. In this case, artificial intelligence methods AI and conventional signal processing technologies can be used. This preprocessing unit is specific to sensor model type but essentially caters for efficient sensor-agnostic data transmission.

The example of the image-processing stages can be used to provide a good explanation of this. In that case, the preprocessing unit 110 corresponds to a computation unit in which the consolidated stages of the image processing controllers distance-regulation controller 133 and emergency braking assistance controller 132 are combined. The image-processing stages are what are known as convolutional neural networks (CNNs) that produce feature maps. In this case, image-processing neural networks are also used. The CNNs that extract fundamental features are combined in the preprocessing stage. Examples of such features are contours, edges, contrasts, lines, areas, brightnesses, colors, clarities or noise factors, for example. The stages can be designed to identify/extract the applicable features or to adapt the applicable features thereto. The adaptation can, e.g., involve attenuating or boosting the applicable features. Examples of such stages without claiming completeness are: contour extraction stages, edge detection stages, edge steepening stages, contrast improvement stages, line detection stages, area detection stages, shape detection stages, brightness adjustment stages, color detection stages, color adjustment stages, clarity increase stages, noise reduction stages. The structure and operation of the CNNs is fundamentally assumed to be known.

Figure 3:
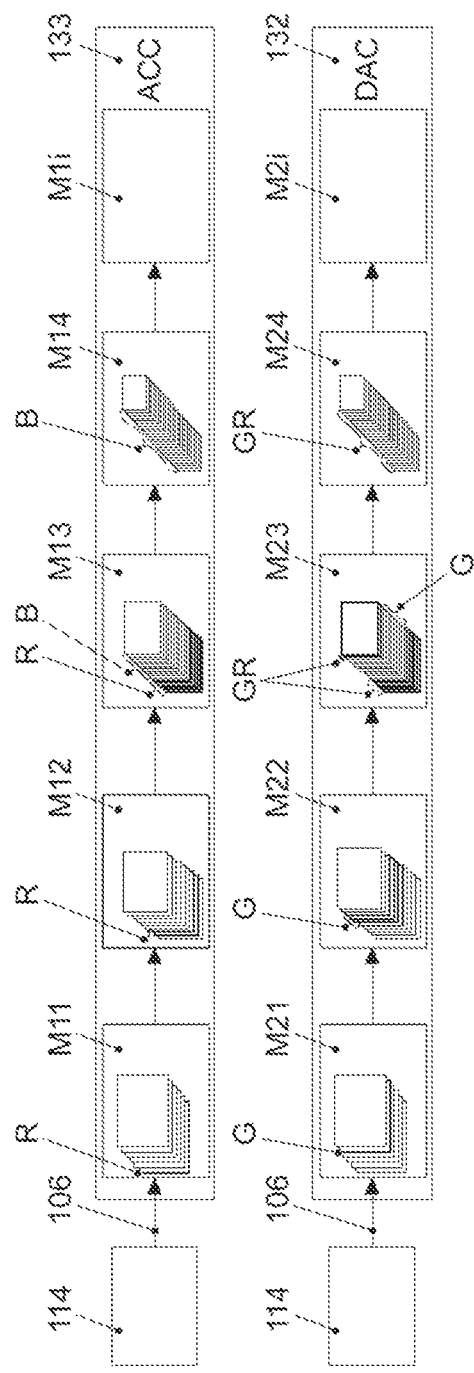
FIG. 3 shows the principle of the individual processing of the sensor data when there are two controllers using the same or similar feature analysis in appropriate layers.

To clarify the principle further, the standard manner of processing will first of all be explained using the example from FIG. 3. Two parallel processing paths are depicted. Identical reference numerals denote the same components as in FIGS. 1 and 2. The upper path shows the processing of the image data recorded by the front camera 114 in the distance-regulation controller 133. The image data come from the front camera, which can be embodied as a video camera. It provides images in SD or HD resolution having a typical frame rate of, by way of example, 25 or 30 Hz. The image data would be transmitted to the gateway controller 140 in an uncompressed state via the CAN bus 102 and on to the distance-regulation controller 133 via the CAN FD bus 106. The processing of the image data in stages would be effected in the stages M11 to M1$i$. In this case, the individual stages could be designed as CNNs. The CNNs compute feature maps, which are depicted as layers per stage in FIG. 3. Which feature maps extracted in the respective stage are identical or equivalent is highlighted in FIG. 3. In the processing stage M11, the bottommost feature map is equivalent to the second topmost feature map in the processing stage M21. In the processing stage M12, the two feature maps following the bottommost feature map are equivalent to the three feature maps in the processing stage M21 that follow the third bottommost feature map. First of all, fundamental processing such as contrast improvement, clarity improvement or noise reduction is effected in the stage M11. In the subsequent stages M12 to M1$i$, the image processing becomes ever more complex, which means that whole image sequences and complex concepts such as faces or transportation vehicles are also detected and processed therein. This culminates in the detection of real objects in the environment of the transportation vehicle. Distance regulation requires at least the transportation vehicle in front to be detected and also the distance from the transportation vehicle in front to be determined.

The lower path shows the processing of the image data in the emergency braking assistance controller 132. The image data of the front camera 114 are also evaluated therein. The image data would likewise reach the emergency braking assistance controller 132 via the gateway controller 140. The image evaluation would be effected in the stages M21 to M2$i$. In this case, quite similar image evaluation to that in the upper path would be effected. Ultimately, the aim is likewise to ascertain the distance from the transportation vehicle in front. Additionally, however, the speed of the approach to the transportation vehicle in front or oncoming transportation vehicle should also be ascertained. As a result, the image processing in the rear stages will be different. However, it is also necessary for other road users/objects to be detected, which means that more in-depth image evaluation therefore also needs to take place. The repeated image evaluation in parallel paths is in parts redundant, energy-intensive and requires an increased hardware involvement. Additionally, the image data possibly need to be transmitted to the various image-processing controllers repeatedly. This can mean a problem with regard to the bus utilization level, depending on the communication bus.

The two functions distance-regulation controller and emergency braking assistance process the raw sensor data of the connected sensors on separate controllers. In this case, besides cleaning up the data (contrast adjustment, sizing) using filters (conventional image processing or learned convolutional core), various feature maps (what are known as filter channels) are generated from the raw sensor data in the first preprocessing. As described, such feature maps can relate by way of example to distributions of edges, color transitions, contrast changes, etc. (cf. layer M11 and layer M21 in FIG. 3). These feature maps are then extended in the order of the processing to produce maps for the distribution of more significant features (patterns, edges, shapes) (cf. layer M12/M13 and layer M22/M23 in FIG. 3).

In this case, the various processing depths have equivalent feature maps (totally identical filter channels or filter channels convertible into one another by linear combination) in them between the two functions: both the emergency braking assist controller 132 and the distance-regulation controller 133 are sensitive to edges (layer M11), detected transportation vehicles, objects on the road and the profile of the lane (more significant features). The separate, redundant computation of these features is superfluous and time- and energy-consuming. Within the realm of a sensor fusion (e.g., front camera 114 and radar sensor 112), this can also relate to the fusion of the two sensor signals and the (joint, separate or partially separate) processing of the sensor information used by the two functions.

In FIG. 3, the feature maps marked by R in the processing stages M11 and M12 are identical or equivalent to the feature maps marked by G in the processing stages M21 and M22. In this case, equivalent means that the feature maps G are either identical to or (linear) combinations of the feature maps R. The feature maps marked by B in the subsequent stages are not equivalent to the feature maps marked by GR and need to be computed individually in each case to ensure correct operation of the system.

Figure 4:
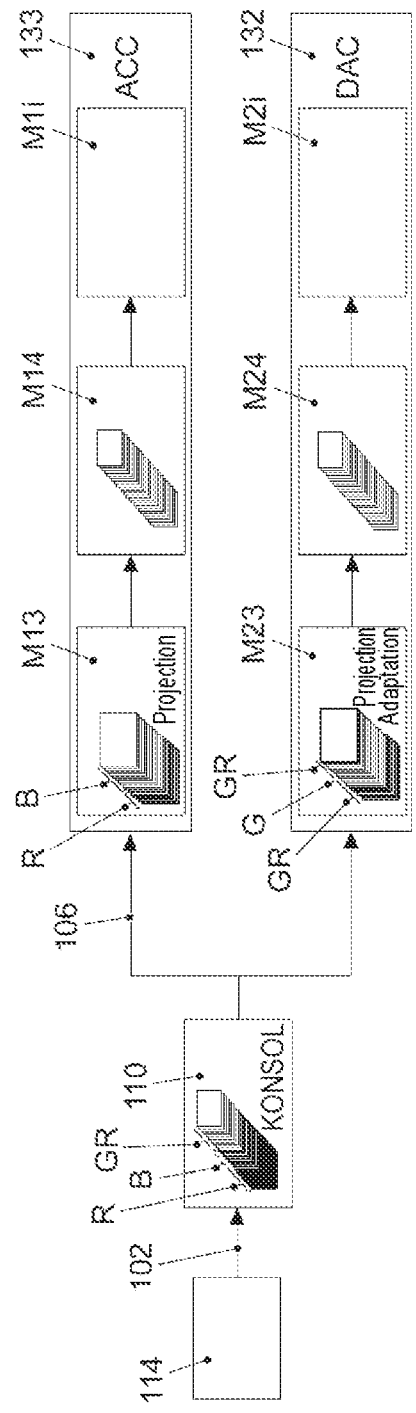
FIG. 4 shows the principle of the joint preprocessing of the sensor data for the same or similar feature analysis in a preprocessing unit when there are two controllers.

It is therefore a proposal of the disclosed embodiments to consolidate the processing in the parallel paths at least in part. This is accomplished by using the preprocessing stage 110. The principle of a consolidated processing using preprocessing stage 110 is shown in FIG. 4.

In the preprocessing unit 110, all the feature maps necessary for implementing the emergency braking assist 132 and the distance-regulation controller 133 are now computed jointly at sensor level (data cleanup, sensor fusion, feature computation) and the results are then forwarded to the controllers 133, 132 for the two assist systems via the transportation vehicle electrical system.

The processing in the preprocessing stage 110 is a function-specific compression of the sensor information and is independent of the sensor model. In this context, function-specific expressly does not mean a dependency on a partial functionality, but rather means a specificity with regard to all of the processing chain that follows for the (semi)automatic driving, for example. The compressed sensor data permit loss-free further processing of the information by subsequent components (without using the raw sensor data), but not necessarily loss-free or somewhat loss-free restoration of the raw sensor data. Thus, all properties of the raw sensor data that are semantically and physically relevant to the further processing are transmitted. The compression is obtained, e.g., by a filtering (for example, noise reduction) or by the extraction of the features, in which case, e.g., only the position of the features in the image need to be transmitted by the feature maps, and no longer the actual image content for these features. In the example from FIG. 4, the processing in the stages M11 and M21 and M12 and M22 is consolidated. These stages then no longer need to be provided for in the controllers 133 and 132. Only from the next stage M13 or M23 onward is the image processing again effected individually in the controllers 133 and 132. Only the consolidated results of the image processing in the preprocessing stage 110 are now transmitted to the gateway 140 and on to the controllers 133 and 132. In this case, it may be necessary for an adaptation/projection of the results to have to be effected at least in one of the controllers 133 and 132 before further processing. If not, it would otherwise not be possible to integrate this stage into the preprocessing unit 110. The adaptation involves a computation operation (transformation), which still needs to be performed with the transmitted results in the target controller to prepare the data for the individual further processing in the target controller. A wide variety of computation operations can be used in this case. Examples of coordinate transformations without claiming completeness are: scalings, translations, rotations, mirrorings, shearings. Other transformations such as linear combinations of filter channels are also possible however. Since, for the interpretation of the controller complex, it is known which controllers are present that need the preprocessed image data, the individual controllers can be equipped with the respectively associated adaptation layer to compute the adjustment of the transmitted results.

In the preprocessing unit 110, all the feature maps necessary for implementing the emergency braking assist 132 and the distance-regulation controller 133 are computed jointly at sensor level (data cleanup, sensor fusion). These are the feature maps marked by R, B and GR. The results are then forwarded via the transportation vehicle electrical system to the controllers 133 and 132 for the two assistance systems. The feature maps R, B go to the distance-regulation controller 133; the feature maps R, GR go to the emergency braking assist 132. The feature maps G necessary for implementing the emergency braking assist 132 can then be computed from the feature maps denoted by R using the applicable (linear) combinations. The consolidated detection can be provided as a firmly defined interface in this case (top-down approach) or can be obtained from the computed consolidation of the two functions (bottom-up approach).

In a further disclosed embodiment, the remainder of the images that is still there after processing could likewise be compressed in the preprocessing unit 110. The known compression methods in the domain of video encoding, such as MPEG2 video encoding, JPEG encoding, H.264 encoding, etc., would be available for this. In this case, however, appropriate decoding would need to take place in the receiving controller to be able to process the images further. It should be borne in mind in this case that the cited video encoding methods are lossy. It is thus necessary to ensure that the losses do not take effect such that the desired objects such as road signs, road markings, pot holes, transportation vehicles, pedestrians, etc., can no longer be identified in the decoded image. However, there are also loss-free methods of image compression that are available and can be employed as an alternative.

Another type of compression can be obtained using one of the methods of header compression. Examples are robust header compression ROHC and van Jacobson TCP/IP header compression, which are of interest for the Ethernet domain to reduce the bus utilization level.

The disclosure is not restricted to the exemplary embodiments described here. There is room for various adjustments and modifications that a person skilled in the art would also consider to be part of the disclosure on the basis of his knowledge in the art.

In an extended disclosed embodiment, the pothole detection function of the chassis controller 131 would also be consolidated as well. Image evaluation of the images from the front camera 114 also takes place in the chassis controller 131. This improves the efficiency of the overall system once more.

A further application option is also for the joint use of a rear radar system for the lane change assist (monitors the traffic behind in the transportation vehicle's own lane and the adjacent lanes) and the park-out assist (monitors cross-traffic when unparking).

All the examples and conditional wordings mentioned herein are intended to be understood without limitation to specifically listed examples of this kind. As such, for example, persons skilled in the art will recognize that the block diagram depicted here is a conceptual view of an exemplary circuit arrangement. Similarly, it can be seen that a depicted flowchart, stage transition diagram, pseudo code and the like are different options for presenting processes that are essentially stored in computer-readable media and can therefore be executed by a computer or processor.

It should be understood that the proposed method and the associated apparatuses can be implemented in various forms of hardware, software, firmware, special processors or a combination thereof. Special processors can comprise application-specific integrated circuits (ASICs), reduced instruction set computers (RISCs) and/or field programmable gate arrays (FPGAs). Optionally, the proposed method and the apparatus are implemented as a combination of hardware and software. The software may be installed as an application program on a program memory device. Typically, this is a machine based on a computer platform that comprises hardware such as, for example, one or more central processing units (CPUs), a random access memory (RAM) and one or more input/output (I/O) interface(s). In addition, an operating system is typically installed on the computer platform. The various processes and functions described here can be part of the application program, or a part that is executed by the operating system.

LIST OF REFERENCE SIGNS

10 Transportation vehicle
102 Data bus—driver assistance
104 Data bus—propulsion
106 Data bus—chassis
110 Preprocessing unit
111 Onboard unit
112 Radar sensor
113 Reversing camera
114 Front camera
121 Engine controller
122 ESP controller
123 Gearbox controller
124 Wheel speed sensor
125 Wheel speed sensor
126 Wheel speed sensor
127 Wheel speed sensor
129 Diagnosis interface
131 Chassis controller
132 Driver assistance controller
133 Distance-regulating controller
134 LCD display unit
140 Gateway
M11-M1*i* Various stages for computing feature maps (path 1)
M21-M2*i* Various stages for computing feature maps (path 2)

The invention claimed is:

1. A preprocessing unit for a communication system, the preprocessing unit comprising:
an interface for a communication bus via which the preprocessing unit receives sensor data from at least one sensor; and
at least one processing stage for processing the sensor data,
wherein the preprocessing unit is configured to forward the processed sensor data to at least two different transportation vehicle function controllers via the same interface for the communication bus or via another interface for performing computational adjustments of the forwarded processed sensor data individually by the at least two different controllers to prepare the processed sensor data for further processing individually by the at least two different controllers, and
wherein the at least one sensor is an imaging sensor and the at least two different controllers are image-processing controllers, wherein the processing of the sensor data received from the at least one sensor performed by the at least one processing stage includes image processing in which a filtering and/or an image processing takes place by one or more neural networks.

2. The preprocessing unit of claim 1, wherein the one or more neural networks are convolutional neural networks.

3. The preprocessing unit of claim 2, wherein the image processing extracts a typical feature in an image and computes a feature map and the sensor data is transmitted to the at least two different controllers in the form of a feature map.

4. The preprocessing unit of claim 3, wherein the typical feature relates to one or more of the features edges, contours, lines, areas, contrast, brightness, color, clarity, noise component.

5. The preprocessing unit of claim 1, wherein the preprocessing unit is a separate computation unit connectable to the communication bus, a module of a controller processing the sensor data, or a module of a central gateway controller.

6. A transportation vehicle comprising:
a preprocessing unit for a communication system of the transportation vehicle,
wherein the preprocessing unit includes an interface for a communication bus via which the preprocessing unit receives sensor data from at least one sensor, and at least one processing stage for processing the sensor data, and
wherein the preprocessing unit forwards the processed sensor data to at least two different controllers via the same interface for the communication bus or via another interface for performing computational adjustments of the forwarded processed sensor data individually by the at least two different controllers to prepare the processed sensor data for further processing individually by the at least two different controllers; and
wherein the at least one sensor is an imaging sensor and the at least two different controllers are image-processing controllers, wherein the processing of the sensor data received from the at least one sensor performed by the at least one processing stage includes image processing in which a filtering and/or an image processing takes place by one or more neural networks.

7. The transportation vehicle of claim 6, wherein the one or more neural networks are convolutional neural networks.

8. The transportation vehicle of claim 7, wherein the image processing extracts a typical feature in an image and computes a feature map and the sensor data is transmitted to the at least two different controllers in the form of a feature map.

9. The transportation vehicle of claim 8, wherein the typical feature relates to one or more of the features edges, contours, lines, areas, contrast, brightness, color, clarity, noise component.

10. The transportation vehicle of claim 6, wherein the preprocessing unit is a separate computation unit connectable to the communication bus, a module of a controller processing the sensor data, or a module of a central gateway controller.

11. A method for processing sensor data in a plurality of controllers, wherein the plurality of controllers being connected to at least one sensor via at least one communication bus, the method comprising:
processing sensor data of the at least one sensor by at least two different controllers of the plurality of controllers in a plurality of stages, wherein at least one processing stage of the plurality of stages is concordant in the at least two different controllers or is at least equivalent in so far as the computation results of the processing by the at least two different controllers are converted into one another by a conversion, wherein the method further comprises preprocessing the sensor data by a preprocessing unit to which the sensor data of the at least one sensor are supplied wherein preprocessing includes processing by one or more neural networks, and wherein the processing of the sensor data in the at least one concordant processing stage is performed in the preprocessing unit, and the processed sensor data are forwarded to the at least two different controllers for individual further processing.

12. The method of claim 11, further comprising performing the converting the computation results in the controller of the at least two different controllers that requires the computation results in the converted form for the individual further processing.

13. The method of claim 11, wherein the at least one sensor is an imaging sensor and the at least two different controllers are image-processing controllers.

14. The method of claim 13, wherein the processing of the imaging sensor in stages is image processing in which a filtering and/or an image processing is performed by a neural network.

15. The method of claim 13, wherein the image processing in one stage extracts a typical feature in the image and forms a feature map and the sensor data is transmitted to the at least two different controllers in the form of a feature map.

16. The method of claim 13, wherein a plurality of stages extracting typical features are provided in the preprocessing unit.

17. The method of claim 16, wherein the typical features relate to one or more of the features edges, contours, lines, areas, contrast, brightness, color, clarity, noise component.

18. The method of claim 11, wherein the preprocessing unit is either connected to the communication bus as a separate computation unit or is provided for as a module of a controller processing the sensor data or as a module of a central gateway controller.

19. The method of claim 11, wherein the at least one communication bus is a serial communication bus of CAN bus, of CAN FD bus, or of FlexRay bus or of Ethernet bus.

* * * * *